United States Patent
Grillo

(10) Patent No.: US 9,341,115 B2
(45) Date of Patent: May 17, 2016

(54) VALVE FOR CONTROLLING FLOW OF A TURBOMACHINE FLUID

(75) Inventor: Joseph Grillo, Bloomfield, CT (US)

(73) Assignee: United Technologies Corporation, Hartford, CT (US)

( * ) Notice: Subject to any disclaimer, the term of this patent is extended or adjusted under 35 U.S.C. 154(b) by 888 days.

(21) Appl. No.: 13/533,202

(22) Filed: Jun. 26, 2012

(65) Prior Publication Data

US 2014/0064908 A1 Mar. 6, 2014

(51) Int. Cl.
*F01D 25/20* (2006.01)
*F02C 7/00* (2006.01)
*F01M 11/06* (2006.01)

(52) U.S. Cl.
CPC . *F02C 7/00* (2013.01); *F01D 25/20* (2013.01); *F01M 11/067* (2013.01); *F05D 2250/51* (2013.01); *F05D 2250/75* (2013.01); *F05D 2260/60* (2013.01); *F05D 2260/98* (2013.01)

(58) Field of Classification Search
CPC ....... F01D 25/18; F01D 25/20; F01D 25/183; F16N 2210/02; F02C 7/06; F16H 57/045; F16H 57/0423; F16H 57/043; F16H 57/0409
See application file for complete search history.

(56) References Cited

U.S. PATENT DOCUMENTS

| | | | | |
|---|---|---|---|---|
| 387,961 A * | 8/1888 | Ryan | ........................... | 137/216.2 |
| 1,897,492 A * | 2/1933 | Ledoux | ........................... | 137/433 |
| 2,022,898 A * | 12/1935 | Niven | ........................... | 184/6.2 |
| 2,239,098 A * | 4/1941 | Hunter | ........................... | 137/38 |
| 2,245,198 A * | 6/1941 | Hunter et al. | ........................... | 137/38 |
| 2,831,490 A * | 4/1958 | Simcock | ........................... | 137/38 |
| 2,860,648 A * | 11/1958 | Harrison | ................ | B64D 37/22 137/38 |
| 2,933,095 A * | 4/1960 | Rumsey | ........................... | 137/38 |
| 2,934,077 A * | 4/1960 | Whiting | ........................... | 137/38 |
| 2,942,612 A * | 6/1960 | Klank, Jr. | ........................... | 137/43 |
| 2,982,375 A | 5/1961 | Victor | | |
| 2,983,331 A * | 5/1961 | Helsley, Jr. | ........ | B01D 19/0057 96/187 |
| 3,011,517 A * | 12/1961 | Sanford | ................ | F16K 11/056 137/516.25 |
| 3,367,362 A * | 2/1968 | Hoffman | ........................ | 137/517 |
| 3,590,955 A * | 7/1971 | Rau | ........................ | F01M 11/065 184/103.2 |

(Continued)

FOREIGN PATENT DOCUMENTS

| | | |
|---|---|---|
| EP | 1957774 B1 | 4/2009 |
| EP | 2559913 | 2/2013 |
| GB | 580006 | 8/1946 |

OTHER PUBLICATIONS

International Search Report and Written Opinion for International Application No. PCT/US2013/043984 completed on Sep. 3, 2013.

(Continued)

*Primary Examiner* — Craig Kim
*Assistant Examiner* — Wayne A Lambert
(74) *Attorney, Agent, or Firm* — Carlson, Gaskey & Olds, P.C.

(57) ABSTRACT

An exemplary valve device for controlling flow of a turbomachine fluid includes a housing having a first inlet at a first elevation, a second inlet at a second elevation higher than the first elevation, and an outlet. A flow control member is within the housing. The flow control member in a positive g-force environment is biased toward a first position that permits flow through the first inlet to the outlet. The flow control member in a negative g-force environment is biased toward a second position that restricts flow through the first inlet to the outlet.

14 Claims, 2 Drawing Sheets

(56) References Cited

U.S. PATENT DOCUMENTS

| | | | | |
|---|---|---|---|---|
| 3,591,316 | A | * | 7/1971 | Piccirilli .................. 417/364 |
| 3,612,083 | A | * | 10/1971 | Kronk .................. 137/43 |
| 3,685,528 | A | * | 8/1972 | Holland .................. 137/43 |
| 3,734,113 | A | * | 5/1973 | Madden .................. 137/40 |
| 3,782,400 | A | | 1/1974 | Hardison et al. |
| 4,052,965 | A | * | 10/1977 | Morris .................. 123/41.05 |
| 4,203,458 | A | * | 5/1980 | Barrett et al. .................. 137/38 |
| 4,252,140 | A | * | 2/1981 | Hildebrandt .................. 137/38 |
| 4,286,573 | A | * | 9/1981 | Nickel .................. 122/14.31 |
| 4,346,731 | A | * | 8/1982 | Sigworth, Jr. .......... F16K 15/04 126/570 |
| 4,346,786 | A | * | 8/1982 | Midgley .................. 184/6.2 |
| 4,535,800 | A | * | 8/1985 | Leech .................. 137/205 |
| 4,580,591 | A | * | 4/1986 | Lebourg .......... B64D 37/22 137/171 |
| 4,611,374 | A | | 9/1986 | Schnelle et al. |
| 4,813,445 | A | * | 3/1989 | Lu .................. 137/38 |
| 4,825,897 | A | * | 5/1989 | Shade .................. 137/271 |
| 4,899,773 | A | | 2/1990 | Harrison |
| 4,947,963 | A | * | 8/1990 | Aho, Jr. .................. 184/6 |
| 4,974,410 | A | * | 12/1990 | Wright et al. .......... 60/39.08 |
| 5,104,091 | A | | 4/1992 | Rathay et al. |
| 5,346,104 | A | * | 9/1994 | Jeong .................. 222/402.19 |
| 6,058,694 | A | | 5/2000 | Ackerman et al. |
| 6,186,372 | B1 | * | 2/2001 | Garcia .......... B05B 11/0059 222/402.19 |
| 6,394,123 | B2 | * | 5/2002 | Menu et al. .................. 137/43 |
| 6,463,819 | B1 | * | 10/2002 | Rago .................. 184/6.2 |
| 6,763,844 | B2 | * | 7/2004 | Lai .................. 137/44 |
| 7,033,134 | B2 | | 4/2006 | Bristol et al. |
| 7,387,189 | B2 | | 6/2008 | James et al. |
| 7,530,430 | B2 | * | 5/2009 | Hoang et al. .................. 184/6.2 |
| 7,681,402 | B2 | * | 3/2010 | Champion et al. .......... 60/779 |
| 7,871,248 | B2 | | 1/2011 | Delaloye |
| 8,020,665 | B2 | | 9/2011 | Sheridan et al. |
| 8,051,869 | B2 | * | 11/2011 | Parnin et al. .................. 137/1 |
| 8,555,915 | B2 | * | 10/2013 | Brunner .......... E03C 1/12 137/493.8 |
| 2004/0069570 | A1 | | 4/2004 | Baumann |
| 2004/0244832 | A1 | * | 12/2004 | Sonnleitner et al. .......... 137/38 |
| 2005/0023836 | A1 | | 2/2005 | Abdalla |
| 2006/0054406 | A1 | | 3/2006 | Delaloye |
| 2006/0090964 | A1 | | 5/2006 | Hoang et al. |
| 2009/0235630 | A1 | | 9/2009 | Norris |
| 2012/0090715 | A1 | | 4/2012 | Fenwick |

OTHER PUBLICATIONS

International Preliminary Report on Patentability for PCT Application No. PCT/US2013/043984, mailed Jan. 8, 2014.

European Search Report for corresponding European Application No. 13809658.1 dated Jun. 16, 2015.

* cited by examiner

VALVE FOR CONTROLLING FLOW OF A TURBOMACHINE FLUID

BACKGROUND

This disclosure relates generally to a valve and, more particularly, to a valve for controlling turbomachine fluid flow during positive and negative g-force flight conditions.

Turbomachines, such as gas turbine engines, typically include a fan section, a compression section, a combustion section, and a turbine section. Turbomachines may employ a geared architecture connecting portions of the compression section to the fan section.

Turbomachines may be used to propel an aircraft in flight, for example. The g-forces acting on the turbomachine are typically positive when the aircraft is in flight. Occasionally, the g-forces acting on the turbomachine are negative when the aircraft is in flight. Some areas of the turbomachine require a relatively constant supply of lubricant. These areas must receive lubricant when positive g-forces act on the turbomachine and when negative g-forces act on the turbomachine.

SUMMARY

A valve device for controlling flow of a turbomachine fluid according to an exemplary aspect of the present disclosure includes, among other things, a housing having a first inlet at a first elevation, a second inlet at a second elevation higher than the first elevation, and an outlet. A flow control member is within the housing. The flow control member in a positive g-force environment is biased toward a first position that permits flow through the first inlet to the outlet, and the flow control member in a negative g-force environment is biased toward a second position that restricts flow through the first inlet to the outlet.

In a further non-limiting embodiment of the foregoing valve device, the flow control member may have a generally spherical shape.

In a further non-limiting embodiment of either of the foregoing valve devices, the flow may be a flow of a lubricant from a lubricant supply tank.

In a further non-limiting embodiment of any of the foregoing valve devices, the housing is disposed within the lubricant supply tank.

In a further non-limiting embodiment of any of the foregoing valve devices, the second inlet may receive fluid when the flow control member is in the negative g-force environment.

In a further non-limiting embodiment of any of the foregoing valve devices, the pump may move flow through the first inlet to the outlet when the flow control member is in the positive g-force environment, and the pump may move flow through the second inlet to the outlet when the flow control member is in the negative g-force environment.

In a further non-limiting embodiment of any of the foregoing valve devices, the flow control member may be submerged within fluid when the flow control member is in the positive g-force environment, and the flow control member may not be submerged within fluid when the flow control member is in the negative g-force environment.

In a further non-limiting embodiment of any of the foregoing valve devices, a buoyancy of the flow control member within fluid may bias the flow control member toward the first position, and a suction force may bias the flow control member toward the second position.

In a further non-limiting embodiment of any of the foregoing valve devices, the flow control member may be floatable in the fluid.

A turbomachine assembly according to an exemplary aspect of the present disclosure includes, among other things, a first turbomachine fluid container, a second turbomachine fluid container, and a valve configured to control the flow of a turbomachine fluid between the first and second turbomachine fluid containers. The valve in a positive g-force environment is biased toward a first position that permits flow through a first inlet of the valve, and the valve in a negative g-force environment is biased toward a second position that restricts flow through the first inlet and permits flow through a second inlet of the valve. The first inlet is vertically below the second inlet.

In a further non-limiting embodiment of the foregoing turbomachine assembly, buoyancy may bias the flow control member toward the first position and suction may bias the flow control member toward the second position.

In a further non-limiting embodiment of either of the foregoing turbomachine assemblies, the assembly may include a pump for moving the fluid.

In a further non-limiting embodiment of any of the foregoing turbomachine assemblies, the first inlet and the second inlet may be disposed within the first turbomachine fluid container.

In a further non-limiting embodiment of any of the foregoing turbomachine assemblies, the second turbomachine fluid container may be a geared architecture of a turbomachine.

In a further non-limiting embodiment of any of the foregoing turbomachine assemblies, the first inlet may be positioned at a lower elevation than the second inlet.

A method of controlling a turbomachine fluid flow according to another exemplary aspect of the present disclosure includes, among other things, permitting flow through a first inlet to an outlet in a positive g-force environment, restricting flow through the first inlet in a negative g-force environment, and permitting flow through a second inlet to the outlet under the negative g-force environment.

In a further non-limiting embodiment of the foregoing method of controlling a turbomachine fluid flow, the method may include permitting flow through the first inlet by floating a flow control member away from the first inlet.

In a further non-limiting embodiment of either of the foregoing methods of controlling a turbomachine fluid flow, the method may include restricting flow through the first inlet by suctioning a flow control member against the first inlet valve seat.

In a further non-limiting embodiment of any of the foregoing methods of controlling a turbomachine fluid flow, the method may include communicating flow from the outlet to a geared architecture of a turbomachine.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
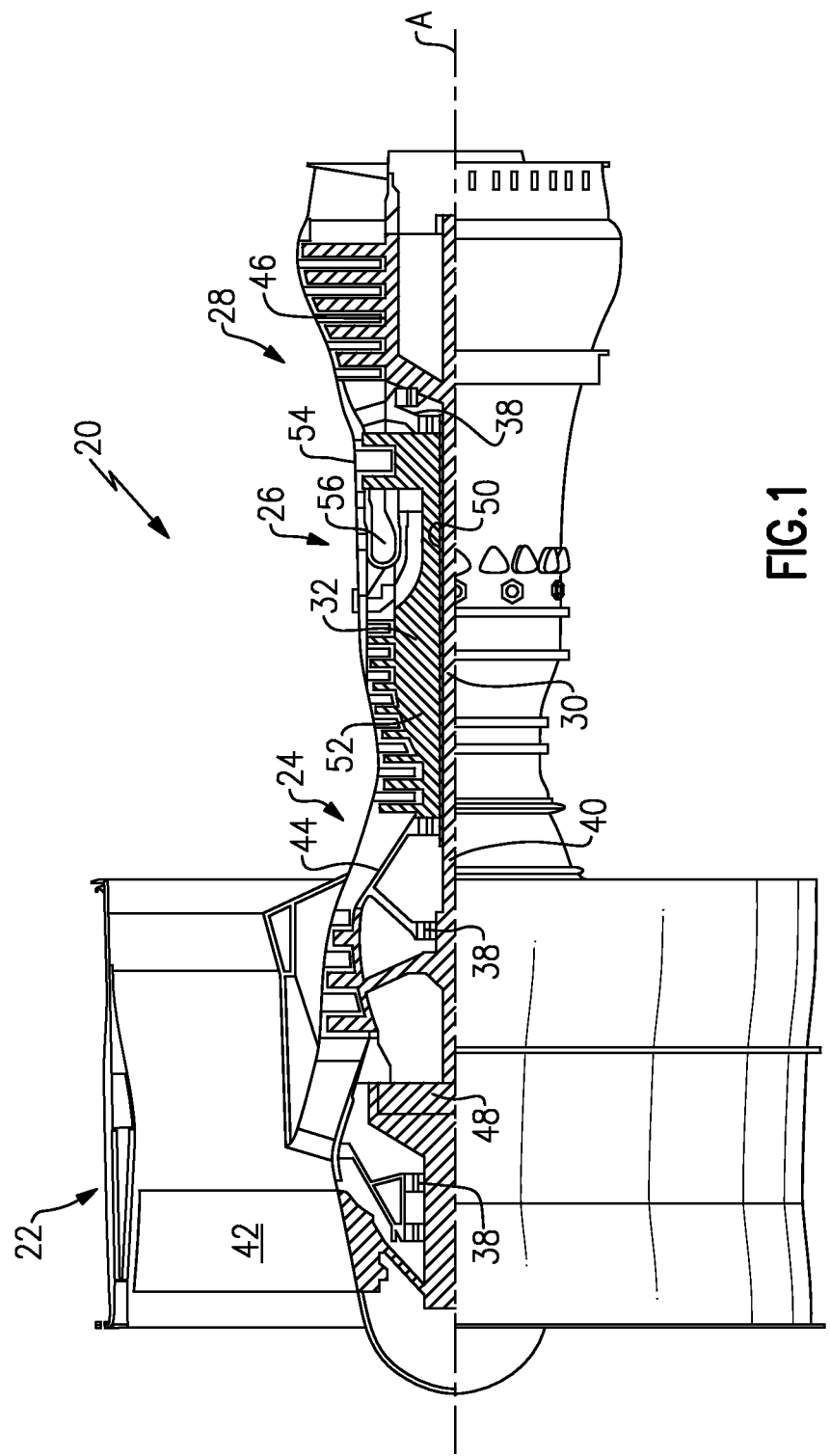
FIG. 1 shows a schematic view of an example turbomachine.

FIG. 1 schematically illustrates an example turbomachine, which is a gas turbine engine 20 in this example. The gas turbine engine 20 is a two-spool turbofan gas turbine engine that generally includes a fan section 22, a compression section 24, a combustion section 26, and a turbine section 28.

Although depicted as a two-spool turbofan gas turbine engine in the disclosed non-limiting embodiment, it should be understood that the concepts described herein are not limited to use with turbofans. That is, the teachings may be applied to other types of turbomachines and turbine engines including three-spool architectures. Further, the concepts described herein could be used in environments other than a turbomachine environment and in applications other than aerospace applications, such as automotive applications.

In the example engine 20, flow moves from the fan section 22 to a bypass flowpath. Flow from the bypass flowpath generates forward thrust. The compression section 24 drives air along the core flowpath. Compressed air from the compression section 24 communicates through the combustion section 26. The products of combustion expand through the turbine section 28.

The example engine 20 generally includes a low-speed spool 30 and a high-speed spool 32 mounted for rotation about an engine central axis A. The low-speed spool 30 and the high-speed spool 32 are rotatably supported by several bearing systems 38. It should be understood that various bearing systems 38 at various locations may alternatively, or additionally, be provided.

The low-speed spool 30 generally includes a shaft 40 that interconnects a fan 42, a low-pressure compressor 44, and a low-pressure turbine 46. The shaft 40 is connected to the fan 42 through a geared architecture 48 to drive the fan 42 at a lower speed than the low-speed spool 30.

The high-speed spool 32 includes a shaft 50 that interconnects a high-pressure compressor 52 and high-pressure turbine 54.

The shaft 40 and the shaft 50 are concentric and rotate via bearing systems 38 about the engine central longitudinal axis A, which is collinear with the longitudinal axes of the shaft 40 and the shaft 50.

The combustion section 26 includes a circumferentially distributed array of combustors 56 generally arranged axially between the high-pressure compressor 52 and the high-pressure turbine 54.

In some non-limiting examples, the engine 20 is a high-bypass geared aircraft engine. In a further example, the engine 20 bypass ratio is greater than about six (6 to 1).

The geared architecture 48 of the example engine 20 includes an epicyclic gear train, such as a planetary gear system or other gear system. The example epicyclic gear train has a gear reduction ratio of greater than about 2.3 (2.3 to 1).

The low-pressure turbine 46 pressure ratio is pressure measured prior to inlet of low-pressure turbine 46 as related to the pressure at the outlet of the low-pressure turbine 46 prior to an exhaust nozzle of the engine 20. In one non-limiting embodiment, the bypass ratio of the engine 20 is greater than about ten (10 to 1), the fan diameter is significantly larger than that of the low pressure compressor 44, and the low-pressure turbine 46 has a pressure ratio that is greater than about 5 (5 to 1). The geared architecture 48 of this embodiment is an epicyclic gear train with a gear reduction ratio of greater than about 2.5 (2.5 to 1). It should be understood, however, that the above parameters are only exemplary of one embodiment of a geared architecture engine and that the present disclosure is applicable to other gas turbine engines including direct drive turbofans.

In this embodiment of the example engine 20, a significant amount of thrust is provided by the bypass flow due to the high bypass ratio. The fan section 22 of the engine 20 is designed for a particular flight condition—typically cruise at about 0.8 Mach and about 35,000 feet. This flight condition, with the engine 20 at its best fuel consumption, is also known as "Bucket Cruise" Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example engine 20 is less than 1.45 (1.45 to 1).

Low Corrected Fan Tip Speed is the actual fan tip speed divided by an industry standard temperature correction of Temperature divided by $518.7^{\wedge}0.5$. The Temperature represents the ambient temperature in degrees Rankine. The Low Corrected Fan Tip Speed according to one non-limiting embodiment of the example engine 20 is less than about 1150 fps (351 m/s).

Figure 2:
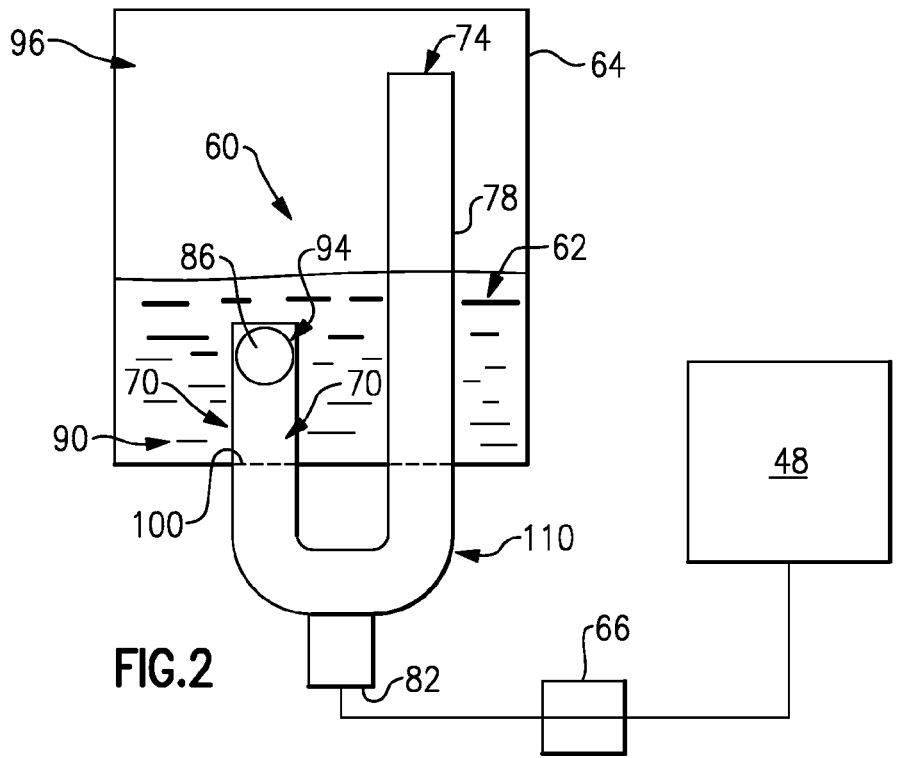
FIG. 2 shows a partially schematic view of an example valve device in a positive g-force environment.
Figure 3:
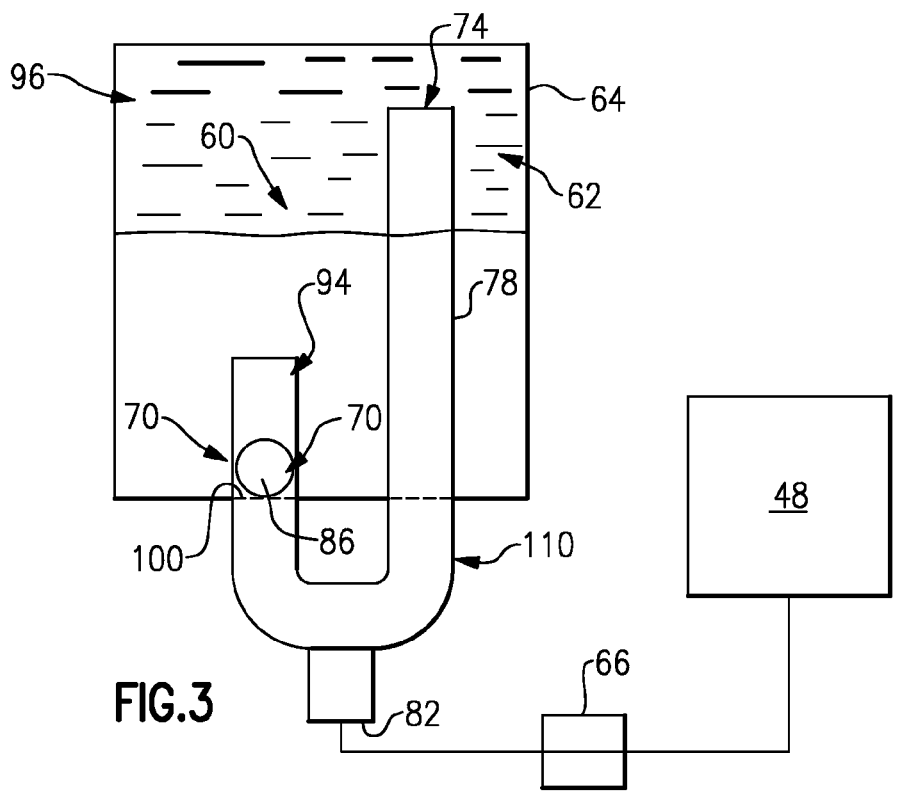
FIG. 3 shows a partially schematic view of the example valve device of FIG. 2 in a negative g-force environment.

Referring to FIGS. 2 and 3 with continuing reference to FIG. 1, a valve device 60 controls flow of a fluid within the engine 20. In this example, the valve device 60 controls flow of a lubricant 62, which is a type of fluid, from a lubricant supply 64 to the geared architecture 48 of the engine 20. In this example, the lubricant supply 64 and the geared architecture 48 are both types of turbomachine fluid containers. A pump 66 draws lubricant from the lubricant supply 64 to the geared architecture 48. Portions of the lubricant supply 64 that are not filled with lubricant contain air, other portions contain a mixture of air and lubricant.

The example valve device 60 includes a first inlet 70 and a second inlet 74. Fluid moves into a housing 78 of the valve device 60 primarily through the first inlet 70 or the second inlet 74. Fluid exits from the housing 78 at an outlet 82. Fluid moves from the housing 78 to the geared architecture 48, in this example.

The valve device 60 includes a flow control member 86 within the housing 78. The example cross-section of the housing is circular and flow control member 86 has a generally spherical shape. Other shaped flow control members such as cylindrical, cone shape, are also contemplated. The example flow control member 86 is floatable within the lubricant 62 held by the lubricant supply 64.

The engine 20 typically operates in a positive g-force environment when an aircraft propelled by the engine 20 is in flight. In the positive g-force environment, positive g-forces act on the engine 20, the lubricant 62, and the valve device 60. In positive g-force environments, the positive g-forces cause the lubricant 62 within the lubricant supply 64 to collect at a vertical bottom region 90 of the lubricant supply 64.

The flow control member 86 is submerged within the lubricant 62 in the positive g-force environment. Since the flow control member 86 floats within the lubricant 62, the flow control member 86 is forced upwards against a stop 94 of the valve when the flow control member 86 is submerged. Biasing the flow control member 86 away from the first inlet 70 allows lubricant to pass through the first inlet 70 into the housing 78, and to the geared architecture 48.

The engine 20 occasionally may operate in a negative g-force environment when the aircraft is in flight. In the negative g-force environment, negative g-forces act on the engine 20, the lubricant 62, and the valve device 60. In such environments, lubricant within the lubricant supply 64 is forced vertically upward toward a top vertical region 96 of the lubricant supply 64.

The flow control member 86 is not submerged when the lubricant 62 is moved to the vertical top region 96 of the lubricant supply 64. The stop 94 prevents the flow control member 86 from moving to the vertical top region 96.

When the flow control member 86 is submerged (FIG. 2), the associated buoyancy force is enough to overcome the suction of the pump 66 drawing the flow control member 86 toward the stop 94, which keeps the first inlet 70 open when the flow control member 86 is submerged.

When the flow control member 86 is not submerged (FIG. 3), suction of the pump 66 drawing lubricant through valve device 60 provides sufficient force to draw the flow control member 86 to a seated position against a valve seat 100. Drawing the flow control member 86 against the valve seat 100 effectively closes the first inlet 70, which prevents air from being drawn into the housing 78. In one specific example, the flow control member 86 closes when level of lubricant drops and the pump suction is greater than −0.2 G the weight of the flow control member 86. The displaced volume of lubricant 62 and the resultant force caused by the submersion of the control member 86 in a positive g-force environment is greater than the suction force required to overcome −0.2 G weight of the control member 86 in a negative 'G' environment.

In the negative g-force environment, the second inlet 74 is submerged within the lubricant concentrated at the top vertical region 96 of the lubricant supply 64. Lubricant moves through the second inlet 74 to the housing 78 when operating in the negative g-force environment.

The second inlet 74 is exposed to air when operating in the positive g-force environment. A trap portion 110 of the housing 78 blocks flow of air through the second inlet 74 from exiting the housing 78. The trap portion 110 works in a similar manner is a common household sink trap which prevents sewage gas from entering thru a common pipe connection.

In this example, the first inlet 70 is a vertically lower than the second inlet 74. That is, the first inlet 70 is less elevated than the second inlet 74. As used herein, elevation and vertical relationships refer to distance or height above a reference height when the engine 20 is on level ground or in straight and level flight.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

I claim:

1. A valve device for controlling flow of a turbomachine fluid, comprising:
   a housing having a first inlet at a first elevation, a second inlet at a second elevation higher than the first elevation, and an outlet; and
   a flow control member within the housing, wherein the flow control member in a positive g-force environment is biased toward a first position that permits flow through the first inlet to the outlet when the first elevation is below the second elevation, and the flow control member in a negative g-force environment is biased toward a second position that restricts flow through the first inlet to the outlet when the first elevation is below the second elevation, wherein the flow control member is floatable in the fluid.

2. The valve device of claim 1, wherein the flow control member has a generally spherical shape.

3. The valve device of claim 1, wherein the flow is flow of a lubricant from a lubricant supply tank.

4. The valve device of claim 3, wherein the housing is disposed within the lubricant supply tank.

5. The valve device of claim 1, wherein the second inlet receives fluid when the flow control member is in the negative g-force environment.

6. The valve device of claim 1, wherein a pump moves flow through the first inlet to the outlet when the flow control member is in the positive g-force environment, and the pump moves flow through the second inlet to the outlet when the flow control member is in the negative g-force environment.

7. The valve device of claim 1, wherein the flow control member is entirely submerged within fluid when the flow control member is in the positive g-force environment, and no portion of the flow control member is submerged within fluid when the flow control member is in the negative g-force environment.

8. The valve device of claim 1, wherein a buoyancy of the flow control member within fluid biases the flow control member toward the first position, and a suction force biases the flow control member toward the second position.

9. A turbomachine assembly, comprising:
   a first turbomachine fluid container;
   a second turbomachine fluid container; and
   a valve configured to control the flow of a turbomachine fluid between the first and second turbomachine fluid containers, wherein the valve in a positive g-force environment is biased toward a first position that permits flow through a first inlet of the valve, and the valve in a negative g-force environment is biased toward a second position that restricts flow through the first inlet and permits flow through a second inlet of the valve, the first inlet vertically below the second inlet in the positive g-force environment and the negative g-force environment, wherein buoyancy biases a flow control member of the valve toward the first position and suction biases the flow control member of the valve toward the second position.

10. The turbomachine assembly of claim 9, wherein the second turbomachine fluid container is a geared architecture of a turbomachine.

11. The turbomachine assembly of claim 9, wherein the first inlet is positioned at a lower elevation than the second inlet.

12. A method of controlling a turbomachine fluid flow, comprising:
   permitting flow through a first inlet to an outlet in a positive g-force environment;
   restricting flow through the first inlet in a negative g-force environment;
   permitting flow through a second inlet to the outlet in the negative g-force environment the first inlet vertically below the second inlet in both the positive g-force environment and the negative g-force environment; and
   permitting flow through the first inlet by floating a flow control member away from the first inlet.

13. The method of claim 12, restricting flow through the first inlet by suctioning a flow control member against the first inlet.

14. The method of claim 12, including communicating flow from the outlet to a geared architecture of a turbomachine.

* * * * *